July 16, 1929.  G. MADASCHI  1,721,275
FRAME WITH DOWN TURNABLE WHEELS FOR ALTERNATIVE USE AS
TRACTION CARRIAGE FOR SMALL GUNS AND AS
PLATFORM FOR PLACING THEM IN BATTERY
Filed June 11, 1927  2 Sheets-Sheet 1
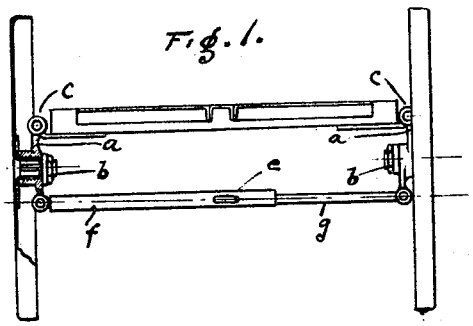
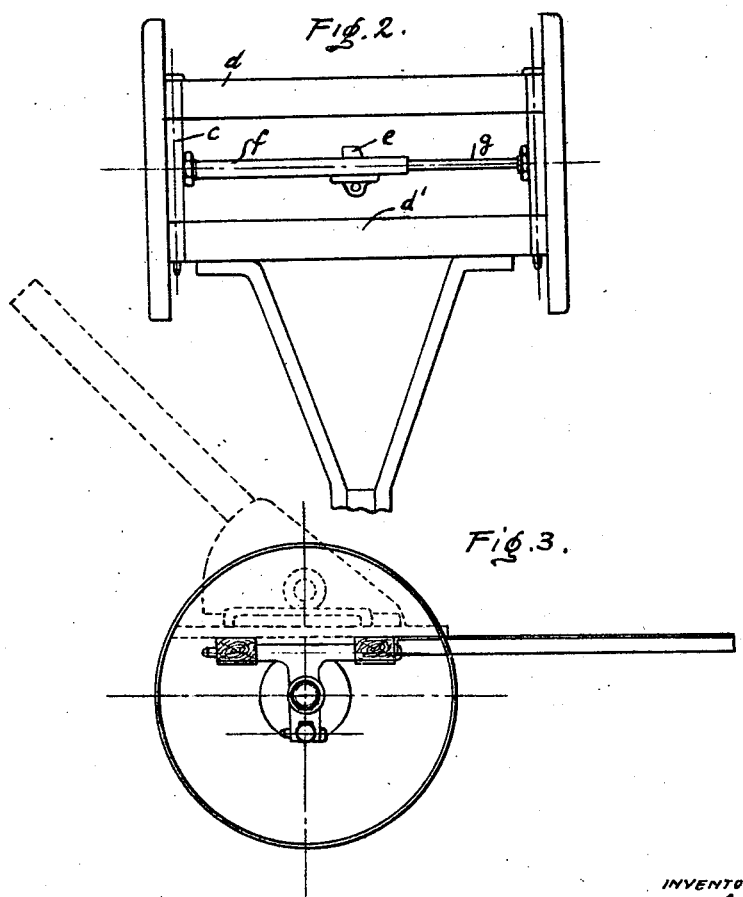
INVENTOR
GIUSEPPE MADASCHI
By
ATTORNEY

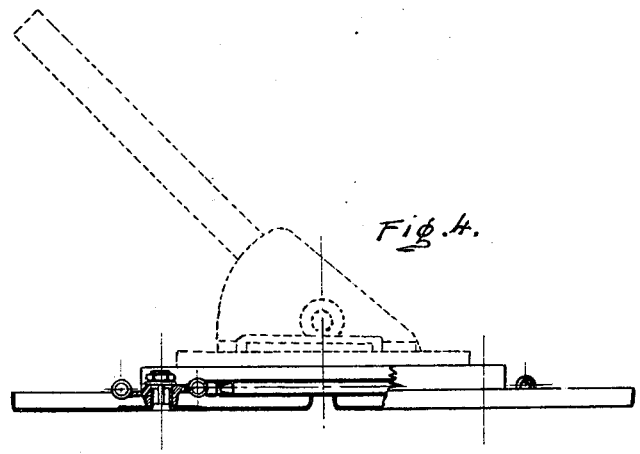
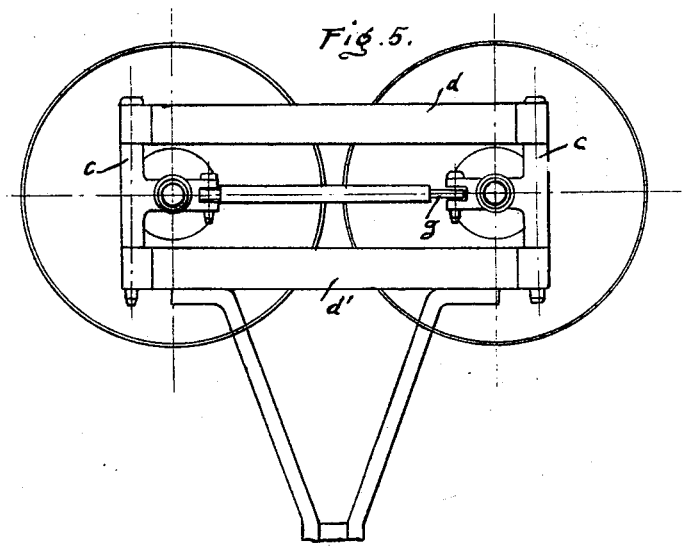

Patented July 16, 1929.

1,721,275

UNITED STATES PATENT OFFICE.

GIUSEPPE MADASCHI, OF MILAN, ITALY.

FRAME WITH DOWN-TURNABLE WHEELS FOR ALTERNATIVE USE AS TRACTION CARRIAGE FOR SMALL GUNS AND AS PLATFORM FOR PLACING THEM IN BATTERY.

Application filed June 11, 1927, Serial No. 198,177, and in Italy July 2, 1926.

The present invention has for its subject matter a frame or carriage suitable for the traction of small guns and possessed of the characteristic of permitting a quick passage from the traction carriage conditions to to those of a stationary gun platform when the gun must be placed in battery.

The frame according to the invention distinguishes itself from the other systems heretofore known by the fact of being fitted with down-turnable wheels, so that the wheels can be set down beneath the carriage axle without need of being detached therefrom, a platform for the gun being thus obtained.

The accompanying drawing schematically illustrates an execution form of the invention by way of example, it being appreciated that this execution form shown is not connected with any determined constructive details and is indicated only for illustration purposes.

Figs. 1–2–3 show the novel support in front elevation partly in section, in plan and in side view respectively.

Figs. 4 and 5 show the novel support in set down wheel conditions, the former figure being an elevation partly in section and the latter a plan.

With reference to Fig. 1, it will be gathered that in the example shown the frame comprises two steel wheels the axles of which are pointing inwardly. A suitable bearing —a— embraces each wheel axle and is secured thereto by the nut —b—. A long bore —c— formed in the bearings —a— normally to the axle permits of securing to the said pieces, by means of a single bolt, the two crossbars —d—d'— that form the upper platform supporting the gun (Fig. 2). The lower portion of the bearing —a— on one carriage side is connected to the lower portion of the bearing —a— on the other side by a crossbar comprising two tubes —f— and —g—, the tubes being coaxial and telescoping in one another and a bolt —e— serving to fix them in the desired position relatively to each other and thus secure the correct wheel gauge. The crossbar made up by the two tubes imparts the necessary stiffness to the system and supplies a rigid axle for the carriage.

When it is desired to turn down the wheels and to transform the frame from a traction carriage into a stationary platform for placing the gun in battery, all that is required is to withdraw the bolt —e—, to slide the tube —g— into the tube —f— and to turn the wheels inwardly against the underside of the frame, so that they lie flat upon the ground. In this manner the gun can be set in firing position in a few moments (Fig. 4).

The contrary operation, viz that of raising the frame from the ground and setting the wheels upright into vertical position, is effected by extending the crossbar built up of tubes —f— and —g—, by stiffening the axle of the carriage and by turning the wheels outwardly. The frame now finds itself again in the conditions of a traction carriage.

The frame may be fitted either with one or with more turning wheels.

Having now particularly described and ascertained the nature of my said invention and in what manner the same is to be performed, I declare that what I claim is:—

1. A gun carriage comprising a pair of wheels, bearings for each wheel, a frame for the gun pivoted to said bearings, an arm pivoted to the bearing of one of the wheels, a tubular arm pivoted to the bearing of the other wheel and in which is adapted to telescope the first arm, and means for locking the telescoping arms so as to secure the wheels in upright position.

2. A gun carriage comprising a pair of wheels having inwardly directed axles, a bearing surrounding each hub, a frame for the gun pivoted to each bearing above its respective axle, an arm pivoted to one of the bearings below its respective axle, a tubular arm pivoted to the other bearing below its respective axle, the said arms adapted to form a telescopic connection, and means for locking the telescoping arms so as to secure the wheels in upright position.

Signed at Milan (Italy), this 27th day of May, 1927.

GIUSEPPE MADASCHI.